(12) United States Patent
Hasegawa

(10) Patent No.: US 12,339,980 B2
(45) Date of Patent: Jun. 24, 2025

(54) DATA REPLACEMENT APPARATUS, DATA REPLACEMENT METHOD, AND PROGRAM

(71) Applicant: NIPPON TELEGRAPH AND TELEPHONE CORPORATION, Tokyo (JP)

(72) Inventor: Satoshi Hasegawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 734 days.

(21) Appl. No.: 17/431,719

(22) PCT Filed: Feb. 20, 2020

(86) PCT No.: PCT/JP2020/006710
§ 371 (c)(1),
(2) Date: Aug. 18, 2021

(87) PCT Pub. No.: WO2020/184126
PCT Pub. Date: Sep. 17, 2020

(65) Prior Publication Data
US 2022/0138338 A1    May 5, 2022

(30) Foreign Application Priority Data
Mar. 11, 2019  (JP) ................. 2019-043663

(51) Int. Cl.
*G06F 16/00*   (2019.01)
*G06F 16/28*   (2019.01)
*G06F 21/62*   (2013.01)

(52) U.S. Cl.
CPC ....... *G06F 21/6218* (2013.01); *G06F 16/285* (2019.01)

(58) Field of Classification Search
CPC ...... G06F 16/35; G06F 16/904; G06F 3/0482; G06F 16/254; G06F 7/24; G06F 3/04842; G06F 16/287
See application file for complete search history.

(56) References Cited

U.S. PATENT DOCUMENTS

| 8,751,499 B1* | 6/2014 | Carasso | G06F 16/35 |
| | | | 709/224 |
| 11,698,901 B1* | 7/2023 | Porath | G06F 16/9038 |
| | | | 707/725 |

(Continued)

FOREIGN PATENT DOCUMENTS

JP    2016-115112 A    6/2016

OTHER PUBLICATIONS

Lefevre et al., "Mondrian Multidimensional K-Anonymity", In Proceedings of the 22nd International Conference on Data Engineering, 2006, pp. 1-11.

(Continued)

*Primary Examiner* — Yicun Wu
(74) *Attorney, Agent, or Firm* — XSENSUS LLP

(57) ABSTRACT

A data replacement apparatus that can perform microaggregation of large-scale data at high speed using only a primary storage device of a small capacity. The data replacement apparatus includes an attribute value set retrieval unit that retrieves a grouped attribute value set into a primary storage device when a size of the grouped attribute value set is equal to or smaller than a predefined size and retrieves the grouped attribute value set into a secondary storage device when the size of the grouped attribute value set is larger than the predefined size. Further, there is a median computation unit that computes a median of the grouped attribute value set at the primary storage device or at the secondary storage device and a division determination unit that sets respective (Continued)

ones of the two attribute value sets formed by the division as new groups.

3 Claims, 5 Drawing Sheets

(56) References Cited

U.S. PATENT DOCUMENTS

2009/0182789 A1\* 7/2009 Sandorfi ............ G06F 11/1004
2014/0189858 A1 7/2014 Chen et al.
2016/0379011 A1 12/2016 Koike et al.

OTHER PUBLICATIONS

LeFevre et al., "Workload-Aware Anonymization Techniques for Large-Scale Datasets", ACM Transactions on Database Systems, vol. 33, No. 3, Article 17, Publication date: Aug. 2008, pp. 17:1-17:47, total 47 pages.
Zhang et al., "MRMondrian: Scalable Multidimensional Anonymisation for Big Data Privacy Preservation", IEEE Transactions on Big Data, IEEE, vol. 8, No. 1, Jan./Feb. 2022, pp. 125-139, total 15 pages.

\* cited by examiner

DATA REPLACEMENT APPARATUS, DATA REPLACEMENT METHOD, AND PROGRAM

CROSS-REFERENCE TO RELATED APPLICATIONS

The present application is based on PCT filing PCT/JP2020/006710, filed Feb. 20, 2020, which claims priority to JP 2019-043663, filed Mar. 11, 2019, the entire contents of each are incorporated herein by reference.

TECHNICAL FIELD

The present invention relates to techniques for concealing individual data in a database, and to a data replacement apparatus, a data replacement method, and a program.

BACKGROUND ART

Techniques for concealing individual data of a database in a deterministic manner include Non-patent Literature 1. A concealing process according to Non-patent Literature 1 performs concealing process of a database by grouping values in the database and replacing them with representative values. This concealing process is called microaggregation.

PRIOR ART LITERATURE

Non-Patent Literature

Non-patent Literature 1: Kristen LeFevre, David J DeWitt, and Raghu Ramakrishnan, "Mondrian multidimensional k-anonymity" In Proceedings of the 22nd International Conference on Data Engineering, pp. 25-25, 2006.

SUMMARY OF THE INVENTION

Problems to be Solved by the Invention

When such a concealing process is implemented on a computer such as a personal computer, however, it is a precondition that processing is performed with all data held on a primary storage device. That is to say, microaggregation cannot be performed on large-scale data that does not completely fit into the primary storage device.

An object of the present invention is therefore to provide a data replacement apparatus that can perform microaggregation of large-scale data at high speed using only a primary storage device of a small capacity.

Means to Solve the Problems

A data replacement apparatus according to the present invention is a data replacement apparatus for replacing attribute values with representative values for each of groups and including an attribute value set retrieval unit, a median computation unit, and a division determination unit.

The attribute value set retrieval unit retrieves a grouped attribute value set into a primary storage device when a size of the grouped attribute value set is equal to or smaller than a predefined size and retrieves the grouped attribute value set into a secondary storage device when the size of the grouped attribute value set is larger than the predefined size. The median computation unit computes a median of the grouped attribute value set at the primary storage device or at the secondary storage device. If a size of each of two attribute value sets which are formed by dividing the grouped attribute value set into two parts based on the median is equal to or greater than a predetermined threshold, the division determination unit sets respective ones of the two attribute value sets formed by the division as new groups.

Effects of the Invention

The data replacement apparatus of the present invention can perform microaggregation of large-scale data at high speed using only a primary storage device of a small capacity.

DETAILED DESCRIPTION OF THE EMBODIMENTS

Figure 1:
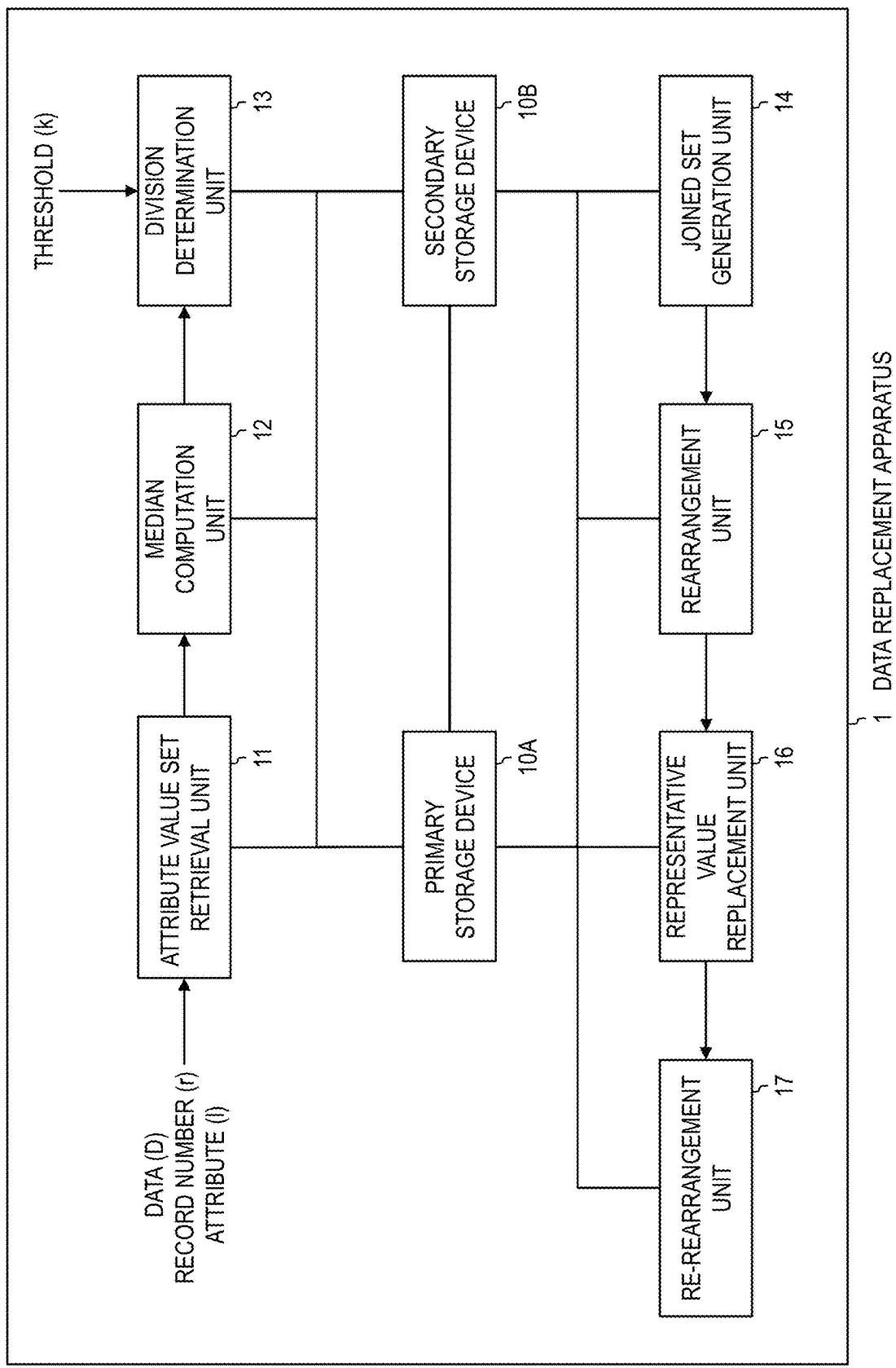
FIG. 1 is a block diagram showing a configuration of a data replacement apparatus in a first embodiment.

An embodiment of the present invention is described in detail below. Components with the same function are given the same reference numerals and overlapping descriptions are omitted.

<Overview of Processing>

The following embodiment discloses a data replacement apparatus, a data replacement method, and a program for performing microaggregation of large-scale data at high speed with a primary storage device of a small capacity. A data replacement apparatus, a data replacement method, and a program in a first embodiment enable high-speed processing by designing algorithms and data structure in consideration of a feature that sequential access (successive accesses) to a secondary storage device (for example, an HDD) is faster than random access, a feature that the secondary storage device (for example, an HDD) is slower than a primary storage device (for example, memory), and a feature that the secondary storage device (for example, an HDD) has a larger storage capacity than the primary storage device (for example, memory).

The embodiment described below uses a Mondrian algorithm (Non-patent Literature 1) as a basic way of creating groups for microaggregation. The Mondrian algorithm performs grouping by dividing data on a per-attribute basis and repeatedly divides data until the size of the resulting groups become equal to a specified threshold, thus creating groups. After the grouping, attribute values in each group are replaced with corresponding representative values, upon which concealing processing is completed.

Two approaches are used in executing of the Mondrian algorithm using only a primary storage device of a small capacity. One is an approach that performs data placement into the primary storage device by an LRU algorithm on the assumption that data placed in the secondary storage device will be locally referenced during repetition of data division.

The other is an approach that performs sorting and applies processing for sequentially reading of attribute values so that random access will not take place during replacement with representative values after grouping.

Herein, a value is denoted as a scalar and expressed by a lowercase alphabet like "a" or an uppercase alphabet. An attribute is denoted as a vector with "^" placed after the letter, like "a^". This representation is due to reasons related to word processing software; a representation "a^", for example, means a bold letter with a circumflex on it:

$$\hat{a}$$

The i-th element of a vector will be denoted as $a_i$. In addition, the number of elements in a vector a^ will be denoted as |a^|. Further, the following is assumed only if each value of a vector $r\hat{} = (r_1, r_2, \ldots r_{|r|})$ is a positive integer.

$$\hat{a}_r = (a_{r_1}, \ldots, a_{r_{|r|}})$$

A matrix is represented by an uppercase letter with "^" placed after the letter. This representation is due to reasons related to word processing software; a representation "X^", for example, means a bold letter with a circumflex on it:

$$\hat{X}$$

It is assumed that data can be represented by a matrix, where attributes are the column and records are the row. For example, data is represented as X^, where the l-th attribute is denoted as $x\hat{}_l$, and the value of the i-th record of a certain attribute l is denoted as $x^{(l)}_i$.

First Embodiment

Figure 2:
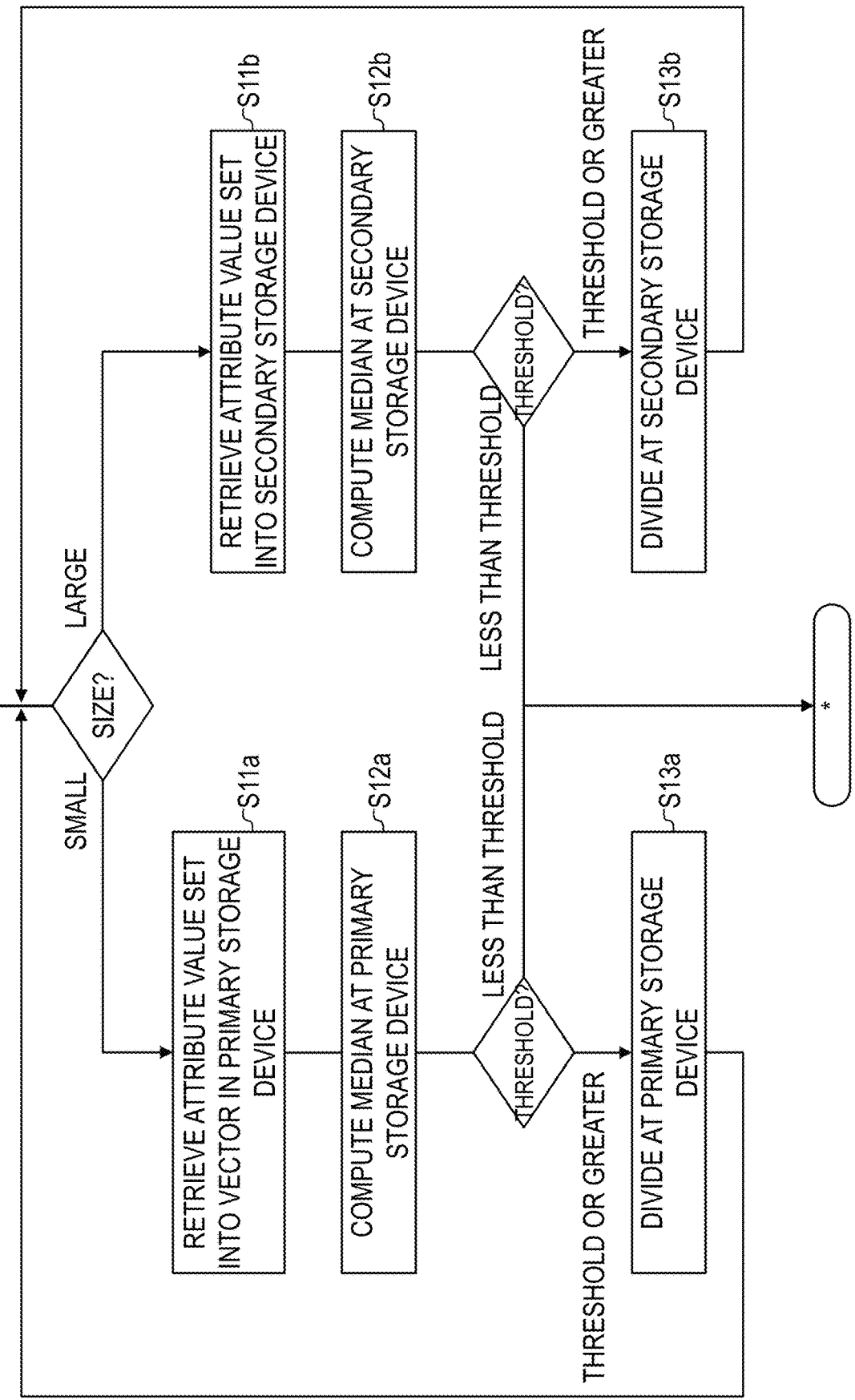
FIG. 2 is a flowchart illustrating a group generation operation of the data replacement apparatus in the first embodiment.
Figure 3:
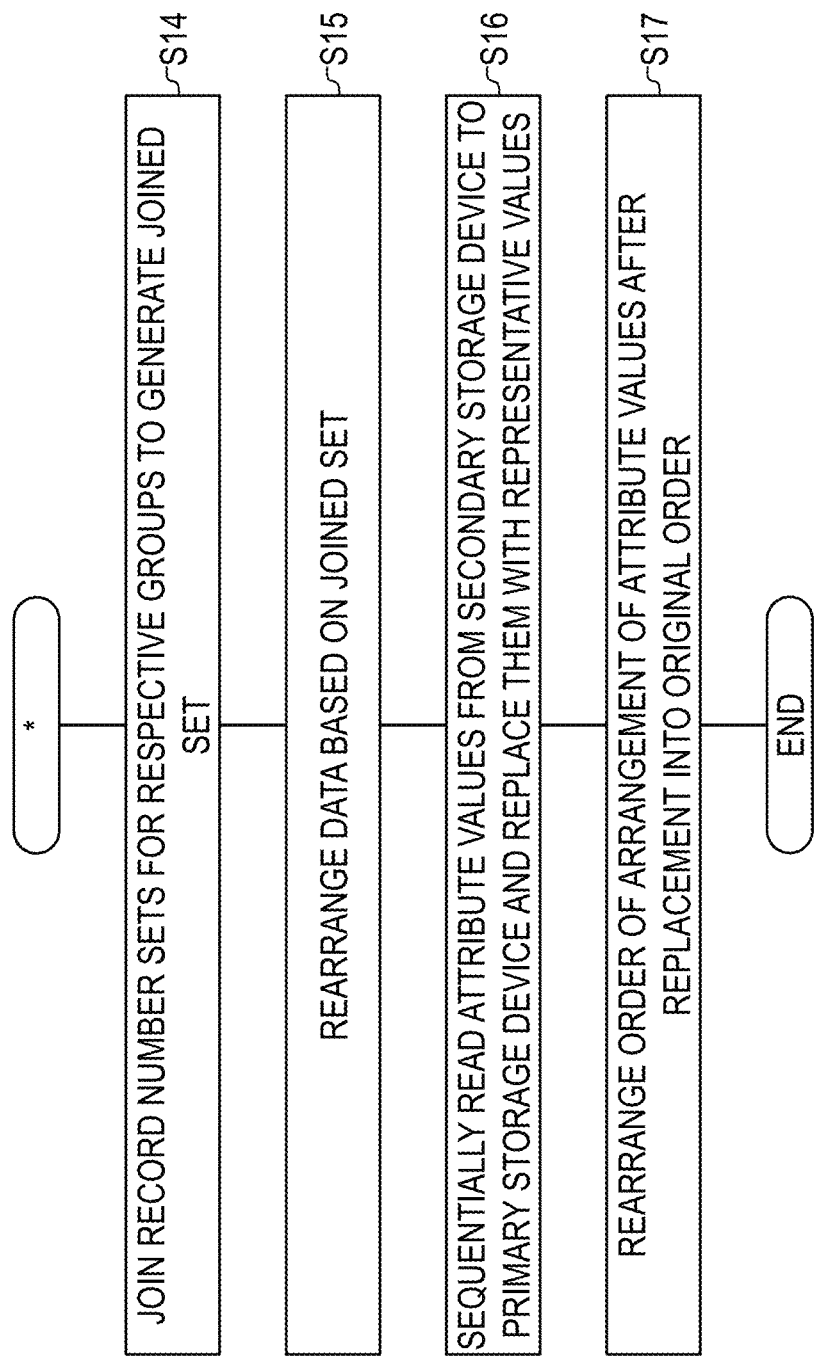
FIG. 3 is a flowchart illustrating a data replacement operation of the data replacement apparatus in the first embodiment.

In the following, a configuration of the data replacement apparatus in the first embodiment is described with reference to FIG. 1. As shown in the drawing, a data replacement apparatus 1 in this embodiment includes a primary storage device 10A, a secondary storage device 10B, an attribute value set retrieval unit 11, a median computation unit 12, a division determination unit 13, a joined set generation unit 14, a rearrangement unit 15, a representative value replacement unit 16, and a re-rearrangement unit 17. Referring to FIGS. 2 and 3, operation of each component is described below.

<Attribute Value Set Retrieval Unit 11>

In this procedure, the attribute value set retrieval unit 11 retrieves a grouped attribute value set. Herein, a grouped attribute value set refers to an attribute value set which has been divided and grouped through the operation of the division determination unit 13, to be discussed later. When the operation of the division determination unit 13 has not been executed yet (that is, in an initial state), the entire data of an attribute value set is regarded as one group and the entire data of the attribute value set is handled as a grouped attribute value set.

The attribute value set retrieval unit 11 retrieves the grouped attribute value set into the primary storage device 10A when the size of the grouped attribute value set is equal to or smaller than a predefined size (in FIG. 2, conditional branch: size?→small) (S11a), and retrieves the grouped attribute value set into the secondary storage device 10B when the size of the grouped attribute value set is larger than the predefined size (in FIG. 2, conditional branch: size?→large) (S11b).

As mentioned above, the attribute value set retrieval unit 11 preferably updates the grouped attribute value set which has been retrieved into the primary storage device 10A based on the LRU algorithm.

<Median Computation Unit 12>

The median computation unit 12 computes a median of the grouped attribute value set at the primary storage device 10A or at the secondary storage device 10B (S12a, S12b).

<Division Determination Unit 13>

If the size of each of two attribute value sets which are formed by dividing the grouped attribute value set into two parts based on the median is equal to or greater than a predetermined threshold (in FIG. 2, conditional branch: threshold?→threshold or greater), the division determination unit 13 sets the respective ones of the two attribute value sets formed by the division as new groups (S13a, S13b). If the size of either of the attribute value sets formed by the division is less than the predetermined threshold (in FIG. 2, conditional branch: threshold?→less than threshold), loop processing at steps S11 to S13 is exited and processing at step S14 onward is continued on the attribute value set before being divided.

The processing by the attribute value set retrieval unit 11, the median computation unit 12, and the division determination unit 13 (S11 to S13) is repeatedly executed until the groups converge.

<Joined Set Generation Unit 14>

As shown in FIG. 3, the joined set generation unit 14 generates a joined set which is formed by arranging record numbers associated with attribute values such that the attribute values in each of the groups which have converged after repeated execution of processing by the attribute value set retrieval unit 11, the median computation unit 12, and the division determination unit 13 (S11 to S13) are consecutive (S14). For example, when attribute values p1, p2, ..., p|P| are present in group P and attribute values q1, q2, ..., q|Q| are present in group Q, the phrase "such that the attribute values in each of the groups are consecutive" means that they are placed in an order such that the attribute values in one group do not intermingle with the attribute values in the other group, such as p1, p2, ..., p|P|, q1, q2, ..., q|Q|, or q1, q2, ..., q|Q|, p1, p2, ..., p|P|. The joined set generation unit 14 generates a joined set by arranging the record numbers associated with the attribute values so that an order in which "the attribute values in each of the groups are consecutive" mentioned above can be reproduced.

<Rearrangement Unit 15>

The rearrangement unit 15 rearranges the attribute values in the secondary storage device 10B based on the joined set (S15).

<Representative Value Replacement Unit 16>

The representative value replacement unit 16 sequentially executes processing for retrieving some of the rearranged attribute values from the secondary storage device 10B into the primary storage device 10A and replaces the attribute values retrieved into the primary storage device 10A with representative values (S16).

Since the attribute value set in the secondary storage device 10B has been rearranged so that the attribute values in each group are consecutive as mentioned above, the attribute values can be sequentially read from the secondary storage device 10B when they are replaced with representative values, which improves processing speed.

<Re-Rearrangement Unit 17>

The re-rearrangement unit 17 moves the representative values to the secondary storage device 10B and rearranges them into an original order (S17).

In the following, the aforementioned steps are further described with disclosure of examples of specific algorithms.

<<Algorithm 1: Large-Scale Data Grouping Algorithm GROUP>>
Input: the number of records N, the number of attributes M, data D^ stored in the secondary storage device 10B, a threshold k, a record number set r^, and M attribute vector sets A^=a^$_1$, . . . , a^$_M$ (respectively corresponding to M kinds of attributes) to be used in the primary storage device 10A
Output: a record number set R^'=(r^'$_1$, . . . , r^'$_{|R^{^'}|}$) for each group
[1]: determine an attribute l to be divided.
[2]: if |r^|≤|a^$_l$| then (corresponding to conditional branch: size?→small in FIG. 2)
[3]: of the attribute l to be divided, retrieve an attribute value set d^$^{(l)}_r$ corresponding to the record number set r^ into a vector a^$_l$ in the primary storage device 10A by Algorithm 4 (discussed later) (corresponding to S11a).
[4]: compute a median in of d^$^{(l)}_r$ (compute from a^$_l$, corresponding to S12a).
[5]: set a record number set which is less than in of d^$^{(l)}_r$ as lr^, and set a record number set equal to or greater than in as rr^(corresponding to S13a).
[6]: else (corresponding to conditional branch: size?→large in FIG. 2)
[7]: of the attribute l to be divided, place the attribute value set d^$^{(l)}_r$ corresponding to the record number set r^ in the secondary storage device 10B consecutively (corresponding to S11b). Here, to "place consecutively" means to place data consecutively so that no other data is interposed in it.
[8]: compute the median in of d^$^{(l)}_r$ (corresponding to S12b). In doing so, access to values is made by Algorithm 5 (discussed later). Calculation of the median is done such that a vector is externally sorted (for example, merge-sorted) and an intermediate value of the vector is calculated as the median.
[9]: set the record number set which is less than in of d^$^{(l)}_r$ as lr^, and set the record number set equal to or greater than in as rr^(corresponding to S13b).
[10]: end if
[11]: if |lr^|<k OR |rr^|<k then (corresponding to conditional branch: threshold?→less than threshold in FIG. 2)
[12]: return r (corresponding to less than threshold→* in FIG. 2)
[13]: else (corresponding to conditional branch: threshold?→threshold or greater in FIG. 2)
[14]: return GROUP(D^, k, lr^, A^)∪GROUP(D^, k, rr^, A^) (corresponding to processing for returning to the start and looping in FIG. 2)
[15]: end if <<Algorithm 2: Representative Value Replacement Algorithm>>
Input: record set R^' for each group, data D^ stored in the secondary storage device 10B
Output: D^' which has been replaced with representative values
[1]: a set formed by arranging the record number set R^'={r^'$_1$, r^'$_2$, . . . } for each group in sequence and joining the sets (a joined set) is defined as s^(corresponding to S14).
[2]: rearrange the data D^ in the order of the joined set s^ according to Algorithm 3 (discussed later) (corresponding to S15).
[3]: j=1
[4]: for r^'$_i$ in R^' do
[5]: store the j-th to the j+|r^'$_i$|-1-th records into the primary storage device 10A from D^ stored in the secondary storage device 10B, replace them with representative values (for example, averages, medians, user-specified values, and the like), and store them into D^' in sequence (corresponding to S16).
[6]: j=j+|r^'$_i$|
[7]: end for
[8]: rearrange D^' into the original order (corresponding to S17).
[9]: return D^'

Figure 4:
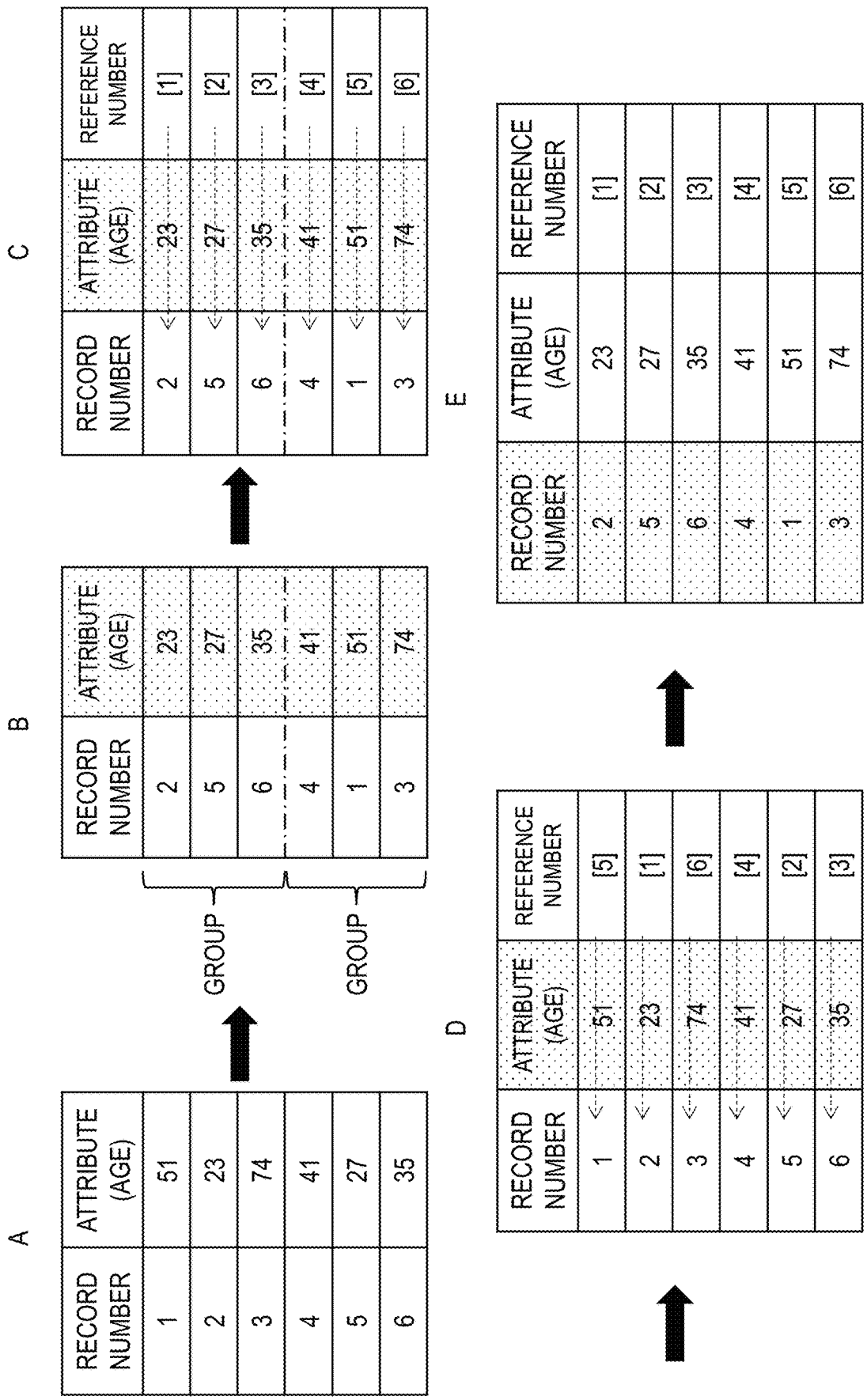
FIG. 4 is a diagram illustrating an exemplary operation of a rearrangement unit of the data replacement apparatus in the first embodiment.

<<Algorithm 3: Algorithm for Changing the Order of Arrangement>>
Input: the vector a^ placed in the secondary storage device 10B, a sequence s^ into which values should be rearranged
Output: rearranged a^'
[1]: prepare b^=1, 2, . . . , |a^| (see FIG. 4C).
[2]: sort b^ with s^ as a key (see FIG. 4D).
[3]: sort a^ with b^ as a key (see FIG. 4E).
[4]: return a^'=a^

<<Algorithm 4: Retrieval of Values by LRU Algorithm>>
Input: the data D^ placed in the secondary storage device 10B, the attribute l to be referenced, a record number $r_i$, a vector t^ in the primary storage device 10A
Output:

$$d_{r_i}^{(l)}$$

[1]: if t^ has an empty space then
[2]: store the corresponding value:

$$d_{r_i}^{(l)}$$

from the secondary storage device 10B into t^.
[3]: else
[4]: if $$d_{r_i}^{(l)}$$

is not present in d^ then
[5]: interchange the least frequently used element in d^ and $$d_{r_i}^{(l)}$$

[6]: end if
[7]: end if
[8]: return $$d_{r_i}^{(l)}$$

in t^

<<Algorithm 5: Retrieval of Values by Lookahead Algorithm>>
Input: the vector a^ placed in the secondary storage device 10B, a position i of an element that should be referenced, a vector c^ in the primary storage device 10A
Output: value $a_i$
[1]: if the i-th element is not present in c^ then
[2]: retrieve the i-th to the i+|c^|-th elements from the secondary storage device 10B and store them in c^.
[3]: end if
[4]: return $a_i$ in c^

Figure 5:
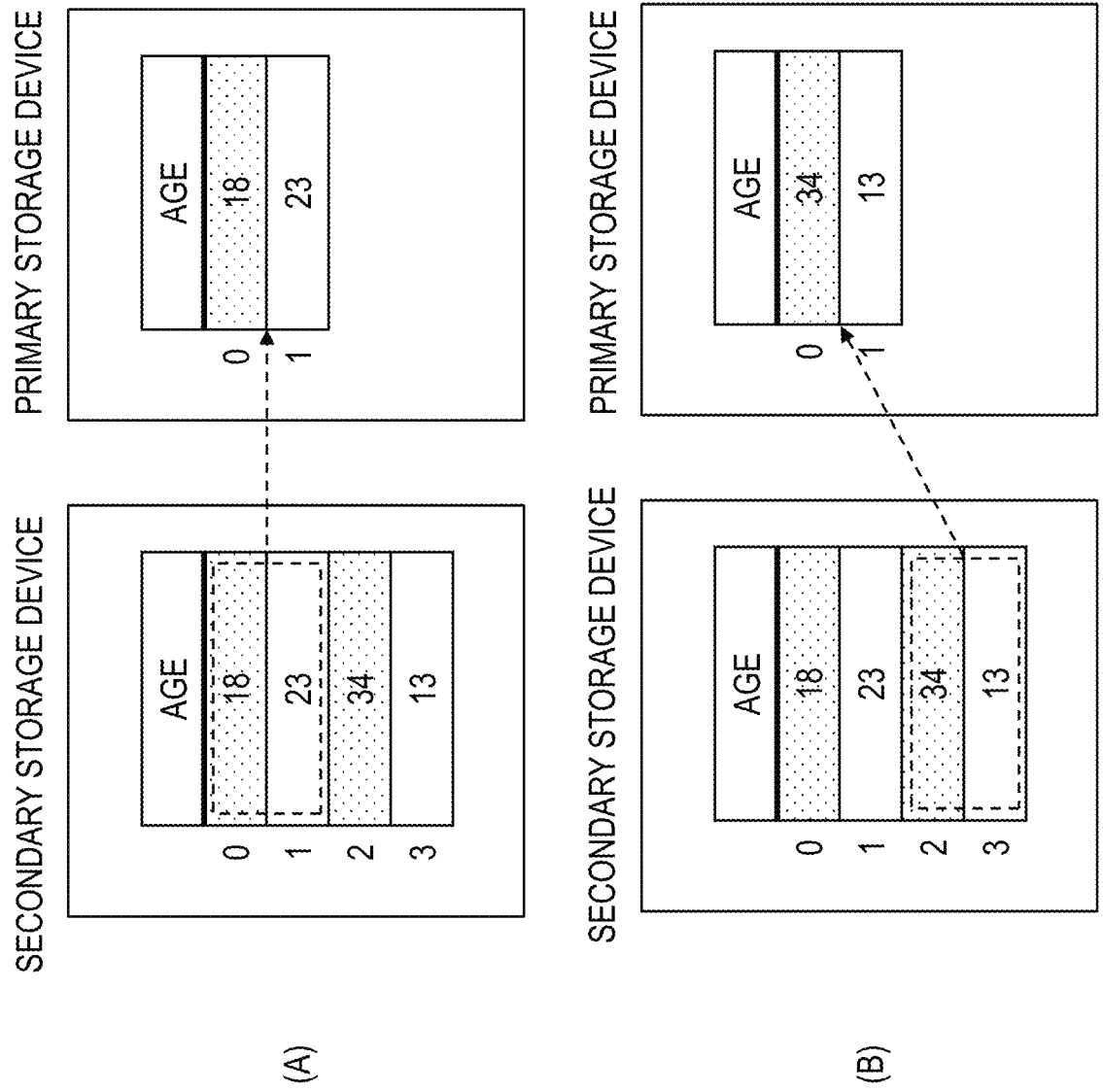
FIG. 5 illustrates lookahead processing.

FIG. 5 shows an example of lookahead processing executed in Algorithm 5. Imagine a case where attribute values of age=18, 23, 34, 13 are stored in the secondary storage device 10B and they are read into the primary storage device 10A in sequence as shown in the drawing. For the example of the drawing, it is assumed that the primary storage device 10A is able to hold up to two elements. First, as shown in FIG. 5A, when the value of the 0th index is accessed, the values of the 0th and the first indices are transferred to the primary storage device 10A and the value of the 0th index in the primary storage device 10A is retrieved. Next, when the value of the first index is accessed, its data is read from the primary storage device 10A. When the value of the second index is subsequently accessed, the corresponding data is not present in the primary storage device 10A, so the values of the second and third indices are transferred from the secondary storage device 10B to the primary storage device 10A and the value of the 0th index in the primary storage device 10A (corresponding to the second in the secondary storage device 10B) is read out, as shown in FIG. 5B. In this manner, assuming successive accesses, lookahead processing is executed when data is read from the secondary storage device 10B.

Effects

The data replacement apparatus, data replacement method, and program according to this embodiment can perform microaggregation of large-scale data in an efficient manner. Since algorithms for the primary storage device are designed with random access in mind, an execution speed instantly drops if the algorithms for the primary storage device are directly exported to operation of the secondary storage device. Thus, considering the fact that a database is placed in the secondary storage device 10B, this embodiment has designed algorithms such that sequential access is made to the secondary storage device 10B as much as possible and that accesses to the secondary storage device 10B are minimized. For example, Algorithm 1 seeks acceleration by varying processing depending on whether data (an attribute value set) fits into a specified area of the primary storage device 10A or not and making an arrangement for enabling sequential access to the secondary storage device 10B if the data does not fit into the area. Algorithm 2 enables sequential access to the secondary storage device 10B by performing sorting in advance.

APPENDIX

The apparatus according to the present invention has, as a single hardware entity, for example, an input unit to which a keyboard or the like is connectable, an output unit to which a liquid crystal display or the like is connectable, a communication unit to which a communication device (for example, communication cable) capable of communication with the outside of the hardware entity is connectable, a central processing unit (CPU, which may include cache memory and/or registers), RAM or ROM as memories, an external storage device which is a hard disk, and a bus that connects the input unit, the output unit, the communication unit, the CPU, the RAM, the ROM, and the external storage device so that data can be exchanged between them. The hardware entity may also include, for example, a device (drive) capable of reading and writing a recording medium such as a CD-ROM as desired. A physical entity having such hardware resources may be a general-purpose computer, for example.

The external storage device of the hardware entity has stored therein programs necessary for embodying the aforementioned functions and data necessary in the processing of the programs (in addition to the external storage device, the programs may be prestored in ROM as a storage device exclusively for reading out, for example). Also, data or the like resulting from the processing of these programs are stored in the RAM and the external storage device as appropriate.

In the hardware entity, the programs and data necessary for processing of the programs stored in the external storage device (or ROM and the like) are read into memory as necessary to be interpreted and executed/processed as appropriate by the CPU. As a consequence, the CPU embodies predetermined functions (the components represented above as units, means, or the like).

The present invention is not limited to the above embodiment, but modifications may be made within the scope of the present invention. Also, the processes described in the embodiment may be executed not only in a chronological sequence in accordance with the order of their description but may be executed in parallel or separately according to the processing capability of the apparatus executing the processing or any necessity.

As already mentioned, when the processing functions of the hardware entities described in the embodiment (the apparatus of the present invention) are to be embodied with a computer, the processing details of the functions to be provided by the hardware entities are described by a program. By the program then being executed on the computer, the processing functions of the hardware entity are embodied on the computer.

The program describing the processing details can be recorded on a computer-readable recording medium. The computer-readable recording medium may be any kind, such as a magnetic recording device, an optical disk, a magneto-optical recording medium, or a semiconductor memory. More specifically, a magnetic recording device may be a hard disk device, flexible disk, or magnetic tape; an optical disk may be a DVD (digital versatile disc), a DVD-RAM (random access memory), a CD-ROM (compact disc read only memory), or a CD-R (recordable)/RW (rewritable); a magneto-optical recording medium may be an MO (magneto-optical disc); and a semiconductor memory may be EEP-ROM (electronically erasable and programmable-read only memory), for example.

Also, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer then reads the program stored in the storage device thereof and executes the processing in accordance with the read program. Also, as another form of execution of this program, the computer may read the program directly from the portable recording medium and execute the processing in accordance with the program and, furthermore, every time the program is transferred to the computer from the server computer, the computer may sequentially execute the processing in accordance with the received program. Also, a configuration may be adopted in which the transfer of a program to the computer from the server computer is not performed and the above-described processing is executed by so-called application service provider (ASP)-type service by which the processing functions are implemented only by an instruction for execution thereof and result acquisition. Note that a program in this form shall encompass information that is used in processing by an electronic computer and acts like a program (such as data that is not a direct command to a computer but has properties prescribing computer processing).

Further, although the hardware entity was described as being configured via execution of a predetermined program on a computer in this form, at least some of these processing details may instead be embodied with hardware.

What is claimed is:

1. A data replacement apparatus for replacing attribute values with representative values for each of groups, the data replacement apparatus comprising:

attribute value set retrieval circuitry that retrieves a grouped attribute value set into a primary storage device when a size of the grouped attribute value set is equal to or smaller than a predefined size and retrieves the grouped attribute value set into a secondary storage device when the size of the grouped attribute value set is larger than the predefined size, wherein the primary storage device is physically separate from the secondary storage device, and the secondary storage device is slower than the primary storage device;

median computation circuitry that computes a median of the grouped attribute value set at the primary storage device or at the secondary storage device;

division determination circuitry that, if a size of each of two attribute value sets which are formed by dividing the grouped attribute value set into two parts based on the median is equal to or greater than a predetermined threshold, sets respective ones of the two attribute value sets formed by the division as new groups;

a joined set generation circuitry that generates a joined set which is formed by arranging record numbers associated with the attribute values such that the attribute values in each of the groups which have converged after repeated execution of processing by the attribute value set retrieval circuitry, the median computation circuitry, and the division determination circuitry are consecutive;

a rearrangement circuitry that rearranges the attribute values in the secondary storage device based on the joined set;

a representative value replacement circuitry that sequentially executes processing for retrieving some of the rearranged attribute values from the secondary storage device into the primary storage device, and replaces the attribute values retrieved into the primary storage device with the representative values; and a re-rearrangement circuitry that moves the representative values to the secondary storage device and rearranges them into an original order.

2. A data replacement method for replacing attribute values with representative values for each of groups, the data replacement method comprising:

retrieving a grouped attribute value set into a primary storage device when a size of the grouped attribute value set is equal to or smaller than a predefined size and retrieving the grouped attribute value set into a secondary storage device when the size of the grouped attribute value set is larger than the predefined size, wherein the primary storage device is physically separate from the secondary storage device and the secondary storage device is slower than the primary storage device;

computing a median of the grouped attribute value set at the primary storage device or at the secondary storage device;

setting respective ones of the two attribute value sets formed by the division as new groups, when a size of each of two attribute value sets which are formed by dividing the grouped attribute value set into two parts based on the median is equal to or greater than a predetermined threshold;

generating a joined set which is formed by arranging record numbers associated with the attribute values such that the attribute values in each of the groups which have converged after repeated execution of the retrieving, the computing and the setting are consecutive;

rearranging the attribute values in the secondary storage device based on the joined set;

sequentially executing processing for retrieving some of the rearranged attribute values from the secondary storage device into the primary storage device, and replacing the attribute values retrieved into the primary storage device with the representative values; and moving the representative values to the secondary storage device and rearranging them into an original order.

3. A non-transitory computer-readable storage medium storing a program for causing a computer to perform a data replacement method for replacing attribute values with representative values for each of groups, the data replacement method comprising:

retrieving a grouped attribute value set into a primary storage device when a size of the grouped attribute value set is equal to or smaller than a predefined size and retrieving the grouped attribute value set into a secondary storage device when the size of the grouped attribute value set is larger than the predefined size, wherein the primary storage device is physically separate from the secondary storage device, and the secondary storage device is slower than the primary storage device;

computing a median of the grouped attribute value set at the primary storage device or at the secondary storage device;

setting respective ones of the two attribute value sets formed by the division as new groups, when a size of each of two attribute value sets which are formed by dividing the grouped attribute value set into two parts based on the median is equal to or greater than a predetermined threshold;

generating a joined set which is formed by arranging record numbers associated with the attribute values such that the attribute values in each of the groups which have converged after repeated execution of the retrieving, the computing and the setting are consecutive;

rearranging the attribute values in the secondary storage device based on the joined set:

sequentially executing processing for retrieving some of the rearranged attribute values from the secondary storage device into the primary storage device, and replacing the attribute values retrieved into the primary storage device with the representative values; and moving the representative values to the secondary storage device and rearranging them into an original order.

* * * * *

UNITED STATES PATENT AND TRADEMARK OFFICE
CERTIFICATE OF CORRECTION

| | | |
|---|---|---|
| PATENT NO. | : 12,339,980 B2 | Page 1 of 1 |
| APPLICATION NO. | : 17/431719 | |
| DATED | : June 24, 2025 | |
| INVENTOR(S) | : Satoshi Hasegawa | |

It is certified that error appears in the above-identified patent and that said Letters Patent is hereby corrected as shown below:

In the Claims

Claim 2, Column 9, Line 56, "rate from the secondary storage device and the second-" should read -- rate from the secondary storage device, and the second- --

Signed and Sealed this
Seventh Day of October, 2025

John A. Squires
*Director of the United States Patent and Trademark Office*